United States Patent
Liu et al.

(10) Patent No.: US 12,469,583 B2
(45) Date of Patent: Nov. 11, 2025

(54) SYSTEM AND METHOD FOR PROCESSING PATIENT-RELATED MEDICAL DATA

(71) Applicant: Radiometer Medical ApS, Brønshøj (DK)

(72) Inventors: Wei Liu, Brønshøj (DK); Michael Midtgaard Andersen, Brønshøj (DK)

(73) Assignee: Radiometer Medical ApS, Brønshøj (DK)

( * ) Notice: Subject to any disclaimer, the term of this patent is extended or adjusted under 35 U.S.C. 154(b) by 0 days.

(21) Appl. No.: 16/954,443

(22) PCT Filed: Dec. 13, 2018

(86) PCT No.: PCT/EP2018/084687
§ 371 (c)(1),
(2) Date: Jun. 16, 2020

(87) PCT Pub. No.: WO2019/121288
PCT Pub. Date: Jun. 27, 2019

(65) Prior Publication Data
US 2021/0020274 A1 Jan. 21, 2021

(30) Foreign Application Priority Data
Dec. 21, 2017 (DK) .................. PA 2017 00735

(51) Int. Cl.
*G16H 10/40* (2018.01)
*G16H 10/60* (2018.01)

(52) U.S. Cl.
CPC ............ *G16H 10/40* (2018.01); *G16H 10/60* (2018.01)

(58) Field of Classification Search
CPC .................... G16H 10/40; G16H 10/60
See application file for complete search history.

(56) References Cited

U.S. PATENT DOCUMENTS

| 6,336,900 | B1 | 1/2002 | Alleckson et al. |
| 8,608,654 | B2 * | 12/2013 | Carlberg ............ G16H 40/67 600/300 |

(Continued)

FOREIGN PATENT DOCUMENTS

| CN | 102169529 A | 8/2011 |
| CN | 106250691 A | 12/2016 |

(Continued)

OTHER PUBLICATIONS

International Search Report for International Application No. PCT/EP2018/084687, Apr. 3, 2019 (two pages).

(Continued)

*Primary Examiner* — Steven G.S. Sanghera
(74) *Attorney, Agent, or Firm* — FROST BROWN TODD LLP (57) ABSTRACT

The invention relates to a patient sample analysis system. The system comprises: at least one medical analysis device adapted to receive a sample, perform a measurement on the sample, and produce a measurement result based on the measurement, wherein the measurement result has a unique identifier; and a medical device management apparatus comprising an input interface adapted to collect the measurement result from the at least one medical analysis device, an output interface adapted to output sample analysis data based on the measurement result towards a point of delivery, and at least one processing module arranged in a data path extending from an upstream end at the input interface to a downstream end at the output interface. The patient sample analysis system further comprises: one or more check points arranged in the data path, wherein each check point is configured to identify the result by the unique identifier and to add a corresponding result status entry in relation to the unique identifier to a check point record, when the result is passed through said check point; and an error (Continued)

handler operable to inspect the check point record, detect the occurrence of an error based on that inspection, determine an error location of the error on the data path, and develop an error correction based on the error location. In a further aspect, a corresponding method for handling medical sample analysis is disclosed.

18 Claims, 3 Drawing Sheets

(56) References Cited

U.S. PATENT DOCUMENTS

| | | | |
|---|---|---|---|
| 2004/0019464 A1* | 1/2004 | Martucci | H04L 63/126 702/189 |
| 2004/0030582 A1 | 2/2004 | Kerr, II | |
| 2004/0233853 A1* | 11/2004 | Law | H04L 49/555 370/242 |
| 2005/0249239 A1 | 11/2005 | Pierce et al. | |
| 2006/0265253 A1 | 11/2006 | Rao et al. | |
| 2008/0092638 A1 | 4/2008 | Brenneman et al. | |
| 2008/0235055 A1 | 9/2008 | Mattingly et al. | |
| 2010/0217623 A1* | 8/2010 | Schoenberg | G16H 10/60 705/3 |
| 2011/0270096 A1 | 11/2011 | Osorio et al. | |
| 2012/0088989 A1 | 4/2012 | Bousamra et al. | |
| 2012/0185267 A1 | 7/2012 | Kamen et al. | |
| 2015/0051922 A1* | 2/2015 | Rentas | G16H 10/60 705/3 |
| 2015/0089280 A1* | 3/2015 | Sade | G06F 11/0793 714/6.12 |
| 2016/0309983 A1* | 10/2016 | Suzuki | H04N 17/002 |
| 2018/0054417 A1* | 2/2018 | Schibuk | H04L 9/3242 |
| 2018/0286510 A1* | 10/2018 | Kwan | G06Q 30/0633 |
| 2019/0108004 A1* | 4/2019 | Kavanagh | G06F 11/3409 |

FOREIGN PATENT DOCUMENTS

| | | |
|---|---|---|
| JP | 2007-334488 A | 12/2007 |
| JP | 2013-003658 A | 1/2013 |
| JP | 2013-178825 A | 9/2013 |
| WO | WO 2012/163360 A1 | 12/2012 |

OTHER PUBLICATIONS

Written Opinion of the International Searching Authority for International Application No. PCT/EP2018/084687 (eight pages).

* cited by examiner

SYSTEM AND METHOD FOR PROCESSING PATIENT-RELATED MEDICAL DATA

This application is a national stage filing under 35 U.S.C. § 371 of International Application No. PCT/EP2018/084687, filed on Dec. 13, 2018, which claims priority of Danish Patent Application No. PA 2017 00735, filed on Dec. 21, 2017. The contents of these applications are each incorporated herein by reference in their entirety.

Embodiments of the methods, product means, systems and devices disclosed herein relate to the field of acquisition and processing of patient-related data such as test and measurement results and/or other clinical data. More particularly, the present invention relates to methods, product means, systems and devices for transporting such clinical data from a medical data source to a point of delivery.

BACKGROUND OF THE INVENTION

Modern health care facilities such as hospitals require many different analyses to be performed using dedicated analysis equipment. Such analysis equipment includes a large variety of different medical devices, also referred to as point-of-care (POC) devices. The devices may be distributed over different locations throughout the entire medical facility, which in itself may have different departments that also may be distributed over sites at different locations. Proper working of these POC devices is of the essence for providing reliable responses and the correctness and timely availability may be decisive for the outcome of medical treatment, which in the worst case can be a matter of life and death. POC devices are therefore subject to extensive compliance requirements including aspects of correct calibration, quality control procedures (QC), consumable content or similar operational status indicators, and/or proper training of the operators. In modern health care facilities, such aspects are often handled by linking the distributed devices together via a data management system, which is adapted to communicate with the devices, e.g. to manage any compliance related issues, to receive status indications and any measurement results from the devices, to transport and to process these results, to store these results, and/or to provide or present such data to subsequent electronic health record systems, which may include hospital information systems (HIS), laboratory information systems (LIS), or the like.

Patient related medical analysis results typically originate from a clinician's decision that a specific medical analysis is required for diagnosis or monitoring of the health status of a particular patient. The medical analysis is then queued for sample taking, and once the sample has been taken, for performing the required measurements in a suitable device. The measurement results are then collected by the data management system, where the patient related medical results are processed and transported to subsequent electronic health record systems, and eventually to a point of use where the processed result can be accessed as a patient related specific medical analysis result, e.g. by the clinician.

Device related measurement results typically originate from a need to ensure and maintain proper operation of the available measurement equipment on a continued basis in compliance with relevant requirements and regulations. For example, such measurements may include calibration and/or quality control procedures to be performed on a regular basis on the concerned devices. The device related measurements may be initiated automatically and/or in a scheduled manner, and the obtained device related measurements may indicate the actual status of the involved measurement device. The device related measurement results are then collected by the data management system, where the device related measurement results are processed and eventually transported to a point of use where the processed result can be accessed as a device related specific result, e.g. by a technician and/or a support system responsible for proper functioning of the medical analysis devices of the facility.

In any case, a medical analysis device (out of a plurality of medical analysis devices) generates a measurement result that is relevant for performing a medical analysis. The measurement result is then collected and processed by the medical device data management system, and transported along a data processing path to a point of delivery.

Examples of POC devices or of other medical analysis devices include analyzers that are operable to analyze samples of biological material, such as body fluids. It is not uncommon that hospitals use POC and/or other medical analysis devices from multiple device manufacturers. Many health care facilities further utilize a data processing system that is configured to manage data related to various operational aspects of the health care facility, such as one or more of the following: medical, administrative, financial, and regulatory issues and the corresponding processing of services. Such a data processing system is often referred to as hospital information system (HIS). Depending on the scope of the function of the data processing system, such a system may also be referred to as a laboratory information system (LIS), a radiology information system (RIS) or the like. For the purpose of the present description, such systems will collectively be referred to as medical facility information systems.

Data from various POC or other medical devices are typically fed into a medical facility information system, including databases with patient-related records and/or any other related point of delivery for the medical data. To this end it is desirable to provide a medical data processing apparatus operable to communicate with a plurality of medical data sources, such as POC devices or other medical analysis devices, at an upstream end of the medical data processing apparatus, and to communicate with a medical facility information system, at a downstream end thereof, e.g. so as to process and transport measurement results or other information from a medical analysis device, via a data path to the medical facility information system. One such medical data processing apparatus is a computer system executing a software program that is marketed under the name "AQURE" Enterprise POC data management system by Radiometer Medical Aps, Denmark. The AQURE Enterprise POC data management system, when executed on a suitable data processing system, is operable to cause the data processing system to communicate with medical analysis devices of different device manufacturers and to provide functionality for monitoring the devices, receiving measurement results, and process the measurement results for subsequent delivery to a medical facility information system, either directly or via further middleware components. As such a medical data processing apparatus is typically operable to manage data obtained from medical analysis devices, e.g. to display, log, store, validate and/or otherwise process data from medical analysis devices, the medical data processing apparatus is sometimes also referred to as a medical device data management apparatus or medical device data management system. As a medical data processing apparatus is often used to communicate and manage data associated with POC devices, they may also be referred to as a POC data management apparatus. Generally, a medical data processing apparatus may be configured to communicate with a plurality of medical analysis devices and to provide functionality for monitoring an operational status of said medical analysis devices, e.g. to present status indicators associated with the respective medical analysis devices to a user of the medical device management apparatus or system. Examples of parameters indicative of an operational status that may be presented by a medical data processing apparatus include one or more of the following: error indicators, calibration information, information indicative of required quality control (QC) procedures, information about required maintenance, and/or the like.

More and more patient-related data from numerous medical data sources, such as measurement results from POC devices and other medical devices, are aggregated in more and more integrated medical facility information systems. As the amount of medical data surveyed, the variety of medical data sources, and the level of integration of the medical data sources and processing systems increases, considerable issues may arise from legacy and regulatory requirements, complexity of system integration architecture as well as from the heterogeneity of the various components in such a set-up. Such issues may range from seamless translation of data to and from normalized formats for communication between devices, middleware and medical facility information systems, and correct validation of analysis results for compliance with regulatory provisions depending on the medical data source to the reliability of correct, reliable, and timely delivery of the results where they are needed in order to provide the best care. The issues become particularly prominent with the upscaling and increasing integration of multiple distributed medical facility information systems, e.g. into a common platform linking together data sources and points of delivery in hospital and laboratory facilities at many different locations and devices. It is, therefore, generally desirable that the collection, processing, and transfer of medical data from a source to a point of delivery can be performed securely, reliably and efficiently.

In one attempt to improve the data management, a system improving the traceability of medical analysis results is, for example, disclosed in WO 2012/163360 A1, which is hereby incorporated by reference.

Despite such efforts to improve data management in the handling of medical analysis results, there is still a continuous need for a reliable and stable system for processing and transporting measurement results that are relevant to medical analysis, such as patient related or device related measurement results, from a source to a point of delivery.

SUMMARY OF THE INVENTION

A first aspect of the invention relates to a patient sample analysis system comprising: at least one medical analysis device adapted to receive a sample, perform a measurement on the sample, and produce a measurement result based on the measurement, wherein the measurement result has a unique identifier; a medical device management apparatus comprising an input interface adapted to collect the measurement result from the at least one medical analysis device, an output interface adapted to output sample analysis data based on the measurement result towards a point of delivery, and at least one processing module arranged in a data path extending from an upstream end at the input interface to a downstream end at the output interface; wherein the patient sample analysis system further comprises: one or more check points arranged in the data path, wherein each check point is configured to identify the result by the unique identifier and to add a corresponding result status entry in relation to the unique identifier to a check point record, when the result is passed through said check point; and an error handler operable to inspect the check point record, detect the occurrence of an error based on that inspection, determine an error location of the error on the data path, and develop an error correction based on the error location. The error handler may e.g. be invoked in response to a status request for a particular, i.e. uniquely identified, measurement result. Once invoked, the error handler investigates on the status of the measurement result in the patient sample analysis system. The error handler may return with the finding of an error, and localize the error to a particular check point or to a section of the data path associated with this check point. The data path section in question may comprise processing tasks to which the error pertains. Conceptually, a localization of the error is performed, if an error is actually detected. Nevertheless, even if no actual error has occurred, a current status of the measurement result in the patient sample analysis system may advantageously be returned in response to a status request. The returned status may also include a localization of the measurement result in the patient sample analysis system.

Thereby an improved error handling associated with patient sample analysis systems is achieved. Notably, the increased complexity, heterogeneity, and distribution of such systems entail a larger risk for errors to occur. An important merit of the present invention therefore already resides in the insight that in such complex systems, the ability to efficiently deal with any error that may occur is of the utmost importance for the reliability and stability of the system. The ability to react fast and effective on potential errors may in fact be decisive on whether or not a measurement result can be saved so as to obtain viable sample analysis data therefrom, or if the measurement result has to be discarded with the consequence that the corresponding patient sample is lost. A timely and efficient handling of any errors throughout the sample analysis system thus has a significant bearing on patient safety, but also on the running cost for maintaining and operating the patient sample analysis system.

The at least one processing module is adapted to process the measurement result so as to produce the sample analysis data based on the measurement result. The processing module or modules for performing the required processing are arranged in a data path. Such processing may include, but is not limited to steps of translation from a device format to a normalized format (at an upstream end of the patient sample analysis system); translation from a normalized format to a delivery point format (at a downstream end of the patient sample analysis system); result classification; quality control and calibration tasks; presentation; storage; any analysis tasks to be performed on the measurement result, and similar processing tasks. The data path for processing of a given measurement result on the way from the upstream end to the downstream end may depend on a specific processing work flow to be performed for the type of the given measurement result.

The terms "upstream" and "downstream" are to be understood in terms of a direction of generic information flow, in the context of a sample analysis cycle, where information about a patient propagate and evolves along the direction of the flow from a point where a user, such as a clinician, requests a sample analysis to a point where a corresponding sample analysis result is returned to the user, wherein the relevant information is carried through the sample analysis cycle in different forms, e.g. starting with a request for a sample analysis in a request form and a unique identifier attributed to this request, a sample taken from a patient in respect of the sample analysis request and linked to the associated unique identifier, a measurement result provided by the medical device in respect of that sample, the measurement result as processed throughout the medical device management system, a record in a medical facility information system, and eventually a sample analysis result for assisting the clinician in the diagnosis of a state of the patient.

The check points are computer implemented elements receiving information related to the processing status of a result. The check points may keep that information for later use, or pass the status on to a separate location for immediate use and/or for storage for later use. In particular, the check points are configured to present the result status information in a format and location accessible to the error handler. The result status information is typically kept at least until successful delivery of the sample analysis data is reported, but may also be kept longer, e.g. for reasons of traceability and performance analysis in respect of the patient sample analysis system as deployed at a given site. The check points are further configured for keeping record of at least a unique result identifier in the check point record and an associated indicator representing a status of the measurement result identified by the unique result identifier. The check point comprises processes to perform any of these actions.

Record keeping is performed by means of a check point record in respect of each check point. Record keeping involves adding a result status entry to the check point record. The check point record may be implemented in any suitable way. For example, a local check point record may be kept at each check point. Alternatively or in addition thereto a global check point record may be kept in a central location, as long as the uniquely identifiable measurement result is tracked in relation to the check point where the measurement result has passed. Analog thereto a check point record may also bundle the result status information in relation to a sub-group of check points out of a plurality of check points in the data path. Accordingly, references to a check point record may be understood as a reference to a local, grouped or global implementation of the check point record, or any combination thereof.

The error handler is a computer-implemented element that communicates with the check point for inspection of check point record entries. In extension of the above, communication between the error handler and the check points may occur by inspection of local check point records, but also through direct inspection of a global and/or grouped check point record. As mentioned above, the error handler may be operated in response to a requesting event, which may be a user initiated request, and/or which may be configured to be initiated in a systematic way, such as in a scheduled or otherwise regular manner. A scheduled or otherwise regular operation of the error handler allows for continuous monitoring of the status of the analysis process, following each patient sample so as to detect if any error occurs. In response to the detection of an error a suitable corrective action can thus be developed and taken immediately.

Data path is sub-divided into data path sections as defined by the check points arranged in the data path. The data path sections may comprise one or more processing steps, such as an entire processing module, or may be for transport/transfer of measurement results between processing steps. A check point may also be directly associated with or integrated in a processing module of the patient sample analysis system. For example, each of the processing modules may comprise a check point at the upstream end thereof and a further check point at a downstream end thereof, wherein the upstream check point works as a check-in to the processing module and the downstream check point works as a check-out from the processing module for the uniquely identified measurement result. Thereby a precise localization of any errors occurring during processing is achieved.

Generally speaking, by inspecting a first check point and a second check point downstream of the first check point, wherein the first and second check points define a data path section connecting the two, the error handler is adapted to determine a check-in-check-out relation for that data path section, evaluate that relation to determine the presence (or absence) of an error and further determine a location on the data path where the error occurred. The error handler is preferably adapted to manage the check-in check-out relations for any of the data path sections defined between two check points in the data path. Typically, the error handler may determine the check-in-check-out relations for data path sections defined between two adjacent check points. However, a coarser granularity of the inspection comparing longer data path section between non-adjacent check-points is also conceivable, e.g. in the context of an investigative search routine initiated by a spontaneous request, where the occurrence of an error may be detected from the mismatch between the check-in (e.g. check-in of the measurement result is registered) and the check-out (e.g. check-out of the same measurement result is lacking) for a first pair of non-adjacent check points, and where the subsequent localization of the error gradually "zooms in" on a data path section between a second pair of check points that still exhibit the mismatch, but which are closer to each other than the first set of check points, preferably to eventually identify the data path section between two adjacent check-points that still exhibit the mismatch. The error handler thus detects and localizes the error by assessing the check-in check-out relations for each of the data path sections defined by the check points in the data path.

More broadly, a check-in-check-out relation may be established by the error handler for the entire cycle of a sample analysis from the point where a user, such as a clinician, requests a sample analysis to the point where a corresponding sample analysis result is returned to the user—as long as events along this cycle are linked to a unique identification of the requested sample analysis in relation to a measurement and the uniquely identified measurement result originating from that measurement. These events may be notified to the error handler or otherwise made accessible for inspection by the error handler.

More broadly, a check-in-check-out relation may be established by the error handler for the entire cycle of a sample analysis from the point where a user, such as a clinician, requests a sample analysis to the point where a corresponding sample analysis result is returned to the user. For example a check-in may be established by registering a request for a patient sample analysis by a clinician. A successful check-out from the sample requesting and sample taking procedure may then be established from the successful reception of a sample for measurement registered at a medical analysis device of the patient sample analysis system. The registration of the successful reception of the sample may then be taken as check-in for measurement. A lack of subsequent check-out from the measurement could then be detected by inspection of a check point record corresponding to a check point arranged downstream of the analysis device, e.g. at an input interface of the medical device management apparatus handling device communication. The error handler may interpret the mismatch due to the lack of check-out as an error and determine the medical device as error location. The error handler may indicate this error and develop an error correction, e.g. by alerting a listed service operator to attend to the faulty medical device, thereby assisting the service operator to immediately correct the fault. The error handler may further have access to information on the operational state of other medical devices suited for the desired measurement, e.g. from a device communication module of the patient analysis system, and develop as a further error correction the indication of an operative replacement for the faulty medical device. Indication may be to a user of the system to avoid the faulty medical device and use the replacement device, or to a robotic sample handling system that may be instructed to re-route samples to the replacement device. This results in an improved uptime and fault tolerance of the system to the benefit of the facility running the system, to the benefit of the clinicians using the system, and last but not least to the benefit of the patients depending on the system for receiving appropriate care.

Advantageously, further information relevant to the assessment of errors may be made accessible through information kept in a check point record linked to specific check points, such as information about successful or unsuccessful processing in a processing module in a data path section immediately upstream or downstream of the check point, expected and actual processing time, error type information, or the like. Thereby the error handler can more efficiently develop an error correction.

Using further information, the error handler may further investigate into the details of the error that has occurred, either by deriving such details from stored information in relation to the error location, or by inspecting further information made accessible to the error handler. Such further information may include a current processing status, an error type, an indication that an unknown error has been noted, or any other relevant information. Thereby, an improved error correction may be developed. In the above example, the error handler may retrieve from the device communication module that the measurement is in progress and only send out alerts when an unsuccessful measurement has been registered as an error message, or after an expected processing time or a pre-determined time-out has expired. The error message may further indicate relevant information for the reasons of an unsuccessful or invalidated measurement, such as the expiry or failure of a suitable calibration, or a lack of consumables required for performing the measurement.

Further according to some embodiments of the patient sample analysis system, each check point comprises an identification process adapted to uniquely identify a measurement result passed through the check point based on its unique identifier, and a record-keeping process adapted to generate a result status entry in relation to the unique identifier. Thereby a simple structure of the check point is implemented. At least one or a plurality out of the one or more check points, but most preferably all check points, obey to that structure.

Further according to some embodiments of the patient sample analysis system, the result status entry includes a time stamp in relation to the unique identifier for the measurement result for passage through the check point.

By linking a time stamp for passage of the measurement result through a check point to the unique identifier of the measurement result, a simple, reliable, and precise record of the measurement result is kept as it is transported from the medical device through the patient sample analysis system towards the point of delivery. Precision and reliability is of particular importance in more complex systems involving numerous medical devices which may be distributed over many locations, and/or where parts or all of the subsequent processing may be performed in a distributed manner or as a service, e.g. using cloud computing and storage. Using time stamps as a global tracking parameter is therefore particularly useful, amongst others since synchronicity is easily ensured by reference to a precise global clock. Thereby effective traceability is ensured that allows for reliable and efficient error handling.

The measurement result may be identified by any suitable unique identifier, e.g. it may be based on a code developed on the basis of information on the analysis device, a running number and/or a time stamp of the measurement at the origin of the result. Preferably, the unique identifier of the measurement result is embedded with or at least unambiguously linked to the above-mentioned sample analysis cycle from a sample analysis request to the delivery of the sample analysis data.

The error handler may thus easily monitor or just check the status of a given sample analysis task in the system, by simple inspecting the time stamps for passage through the check points in the data path and derive the corresponding check-in—check-out relations. For example, if the input interface of the medical device management apparatus collects a patient related measurement result, the error handler may be notified with a timestamp and a unique identifier for said patient-related measurement result. The error handler then checks a subsequent check point to determine if a check-out occurred. If no checkout occurred, the error handler may attempt to resolve the issue or at least alert an operator or user to identify where the issue occurred.

Further according to some embodiments of the patient sample analysis system, at least a first one of the one or more check points is arranged upstream of the at least one processing module.

At least one processing module, or a plurality of processing modules, and preferably each processing module is associated with at least a respective first check point arranged upstream thereof. The first check-point is arranged upstream of the processing task to be performed by the associated processing module. Thereby a check-in functionality is implemented for the processing module, which registers a check-in for processing in the associated processing module (or in the section of the data path for processing of the measurement result) located downstream of the check point. The check-in thus keeps record of the measurement results before processing takes place in the associated processing module or data path section downstream thereof.

Further according to some embodiments of the patient sample analysis system, at least a first one of the one or more check points is arranged downstream of the at least one processing module.

At least one processing module, or a plurality of processing modules, and preferably each processing module is associated with at least a respective second check point arranged upstream thereof. The second check-point is arranged downstream of the processing task to be performed by the associated processing module. Thereby a check-out functionality is implemented for the processing module, which registers a check-out from processing in the associated processing module (or in the associated section of the data path for processing of the measurement result) located upstream of the respective second checkpoint. The check-out thus keeps record of the measurement results after processing has taken place in the associated processing module or data path section upstream thereof.

A synergy effect arises when both a first check point and a second checkpoint of a processing module are implemented in combination. Thereby errors can be immediately localized specifically to the processing module where they occur, and thus for directly developing error corrections that are specific for that processing module.

Further according to some embodiments of the patient sample analysis system, at least one processing module is further configured to keep an error log. At least one processing module or a plurality of processing modules, and preferably each processing module is configured to keep an error log. Thereby, further details of any error occurring is kept and can be made accessible to the error handler, which may be used to develop more qualified error correction specifically adapted to the error that actually occurred. Furthermore, in analogy to the above definition of a check point record in a local, grouped and/or global implementation, an error log may also be understood as a local, grouped and/or global implementation.

The additional information may be kept in combination with the check point, and may include one or more of process status indicators, error log, error type information, an index over records useful for error localization and identification, i.e. the check point may advantageously also keep record of this additional information. Advantageously the error handler is operable to seek and find this information, and use this information for developing an error correction measure. Thereby a faster and more efficient error handling is achieved.

Further according to some embodiments of the patient sample analysis system, the error handler comprises an inspection process, an error detection process, an error localization process, and an error correction process. Thereby, a structure for the implementation of the error handler is achieved. The structured implementation provides improved modularity and is e.g. advantageous for scalability of the error handler in complex system implementations, and further for facilitating easy documentation vis-à-vis inspections for compliance with regulatory or similar requirements.

Further according to some embodiments of the patient sample analysis system, the inspection process is adapted to perform an inspection for result status information in respect of the one or more check points in the data path. Further according to some embodiments, the error detection process is adapted to detect the occurrence of an error based on the result status information from the inspection process. Further according to some embodiments, the error localization process is adapted, upon detection of an error, to localize the error to a check point in the data path and/or to a data path section adjacent to a check point in the data path (upstream or downstream thereof). Further according to some embodiments, the error correction process is adapted to associate error correction measures with the check point or data path section to which the error has been localized by the error localization process.

Thereby, the above-mentioned structure for the implementation of the error handler is further detailed. The more detailed structure of the implementation provides a further improved modularity, thus adding to the above-mentioned advantages of e.g. scalability and documentation. Furthermore, by providing a structure that implements an adaptive error correction, i.e. an error correction that is adapted according to the error location as determined by the error handler, a more efficient and reliable error handling is achieved, and an automated error handling is facilitated.

Developing the error correction based on information associated with the location of the error has the further advantage that the corrective measures suggested and/or taken by the error handler may be customized both according to the source at the origin of the error, and according to the impact a corrective action may have on the remaining parts of the system so as to minimize perturbation in the operation of the patient sample analysis system.

For example, an error may be located to a data path section for data transfer indicating a physical interruption of the data path, e.g. due to a data cable that has been unplugged in between two processing modules. Being able to localize the error and identify a faulty data connection thus allows for by-passing a lengthy error diagnosis and obtaining a fast repair. Similarly, a severe software related processing error may occur. A possible solution may be a system restart, thereby severely affecting the operation of the patient sample analysis system. However, by providing an error handler according to the present invention, the error may be localized to a specific data path section for processing of the measurement results. Further information may be immediately available from an associated error log, which is inspected by the error handler upon localization of the error. The error handler may thus develop a more adequate and less intrusive error correction, such as restart of a software module associated with the error location and/or identified by the additional information from the error log associated with the error location. In developing the adequate error correction, the error handler may be subject to further rules, such as levels of privileges for performing a required error correction, such as restart of a software module that may have a redundant module that can take over in the meantime, or for only suggesting the required corrective action, such as a restart of a central server of a hospital implementation.

Further according to some embodiments of the patient sample analysis system, the at least one processing module includes processes implementing one or more of: device communication, such as towards an upstream end of the patient sample analysis system, data format conversion and aggregation, quality control and calibration management, surveillance of compliance with regulatory requirements, and result storage and retrieval, statistical analysis, analysis of the measurement result, classification of the measurement result according to known values for one or more pathological states of a patient, data presentation, data transfer and presentation, and data exchange with electronic health record systems, such as downstream of the patient sample analysis system).

Advantageously, the processing modules group related processing task together. The processing modules may be implemented in a distributed manner or even operated remotely as a service, such as a cloud service. For example, such cloud service tasks may include one or more of data processing and storage; statistics across different results and/or devices; device calibration/QC and compliance surveillance; result analysis; feeding data to downstream systems; or the like. In that sense a processing task may also refer to transporting a measurement result from one processing module to a subsequent processing module.

Thereby extensive data processing tasks can be handled by the patient sample analysis system, whereby a measurement result can be processed along a data path in order to produce corresponding patient sample analysis data at the downstream end of the patient sample analysis system. By associating check points with each of the processing tasks, or at least with selected ones of a plurality of processing tasks, distributed along the data path, and by further configuring these check points for inspection by the error handler, not only traceability of the processing and transport of the measurement results throughout the patient sample analysis system is considerably enhanced, but also an immediate corrective action is facilitated. A rapid response time and appropriate corrective action is of the essence for reducing the waste of valuable patient samples and can in critical cases, such as in emergency care, make the difference for being able to enact lifesaving care. Further synergistic effects from a prompt error handling and a consequential rapid response with corrective action arise in terms of system stability and system uptime. This is of particular importance in complex patient sample analysis systems, which may be distributed over different locations, and which may be integrated with other electronic health care systems.

Further according to some embodiments of the patient sample analysis system, operation of the error handler is initiated upon request and/or operation of the error handler is performed on a regular basis. Operation of the error handler may be initiated spontaneously, e.g. upon user request or upon request from another electronic system, or systematically, e.g. in a scheduled manner or otherwise regularly, e.g. by continuous monitoring. Operation upon user request has the advantage of improving transparency of the system to the user, as a user at any time can investigate on the status and fate of a requested sample analysis. A regularly initiated operation of the error handler in an automated manner has the advantage that it allows for immediate response in case an error occurs, thereby facilitating a highly responsive and reliable system where the above-mentioned advantages of reliability, reduction of response time, and system stability are enforced in an anticipatory manner, i.e. at a point in time when a corrective action still is possible, rather than retroactively at a later stage when such corrective action might no longer be available, e.g. because a sample's lifetime has expired.

Further according to some embodiments of the patient sample analysis system, the data path includes additional data path sections arranged in an upstream direction beyond the input interface of the medical device management apparatus and/or in a downstream direction beyond the output interface of the medical device management apparatus, and wherein the additional data path sections include at least one or more additional check points.

The data path may advantageously be extended in an upstream direction beyond the input interface of the medical device management apparatus and/or in a downstream direction beyond the output interface of the medical device management apparatus. The data path may thus in an upstream direction be extended to include any steps to be taken prior to collecting the measurement result, such as requesting a patient sample analysis, taking of a sample, preparing of a sample for measurement, and/or performing the measurement itself. In a similar manner, the data path may in a downstream direction be extended to include any steps taken after outputting sample analysis data, such as generating corresponding entries in an electronic health record of a patient, storing data in external databases, feeding patient sample analysis data to a hospital information system and eventually to the clinician that requested the sample analysis, feeding QC and calibration sample analysis data to a laboratory information system, and/or feeding data to any other medical facility information system. In particular, check points may be associated with any, or at least with selected ones, of these additional steps arranged upstream and/or downstream of the medical device management apparatus. Thereby, the advantages of traceability are extended to cover the entire sample analysis process from requesting the sample analysis by a clinician all the way to the use of the sample analysis in clinical care.

It should be noted that the data path generally can be conceived to have any suitable topology, including sections with a branched topology, such as data path sections and nodes with a topology for performing processing steps in parallel, for distributing processing steps, for combining processing steps, and/or for branching off processing steps. Accordingly, check points may advantageously be arranged anywhere in such a complex data path topology and may thus be associated with any such sections and/or nodes of the data path. The topology of the data path may depend on a given sample analysis task, and for the given task may depend on the particular implementation and requirements of a given site. However, the data path for a given task in a given implementation is typically known. Furthermore, any processing steps participating in a given task, any changes to these processing steps, as well as any checkpoints associated therewith may be announced to the error handler and may be flagged for inspection accordingly.

A second aspect of the invention relates to a method of analyzing a medical sample, such as a body fluid sample, in a patient sample-analysis system with respect to at least one analyte. By the method the analog advantages are achieved as already discussed above with respect to a sample analysis system according to any of the embodiments disclosed herein. Further advantageously, the method is implemented using a patient sample analysis system according to any of the embodiments disclosed herein.

According to some embodiments, the method comprises the steps of:
  obtaining a measurement result based on a measurement performed on the sample in respect of the analyte;
  assigning a unique identifier to the measurement result;
  determining a data processing path for processing and transporting the measurement result from an upstream end to a downstream end;
  passing the measurement result through at least one check point arranged in the data path and adding a result status entry in relation to the unique identifier to a check point record;
  processing the measurement result to produce sample analysis data based on the measurement result; and
  outputting the sample analysis data towards a point of delivery;
  inspecting the check point record;
  detecting the occurrence of an error and determining an error location of the error on the data path based on that inspection; and
  developing an error correction based on the error location.

Further according to some embodiments of the method, processing is performed in at least one distinct processing module arranged along the data path.

Advantageously according to some embodiments at least a first one of the one or more check points is arranged upstream of the at least one processing module. (check-in). Advantageously according to some embodiments at least a second one of the one or more check points is arranged downstream of the at least one processing module (check-out).

Further according to some embodiments of the method, detecting an error includes:

inspecting for the presence of result status entries for the uniquely identified measurement result in respect of first and second check points; and stating the occurrence of an error in a location on the data path between the first and second check points, if a mismatch between the result status entries in respect of the first and second check points is found.

Advantageously according to some embodiments processing is performed in processing modules. Advantageously, the processing modules group related processing task together. Processing tasks may include but are not limited to one or more of the above mentioned tasks, such as preparing/converting data, e.g. for subsequent processing, data format conversion and aggregation, quality control and calibration management, surveillance of compliance with regulatory requirements, such as device calibration/QC and compliance surveillance, result storage and retrieval, statistical analysis, analysis of the measurement result, classification of the measurement result according to known values for one or more pathological states of a patient, data presentation, data transfer and presentation, and data exchange with other systems.

Further according to some embodiments of the method, processing the measurement result includes keeping an error log with error information for errors occurring during processing.

Further according to some embodiments of the method, developing an error correction includes:

in respect of the determined error location, inspecting an error log for messages identifying errors; and/or identifying an error message associated with the measurement result, such as by the unique identifier of the measurement result; and/or selecting an error handling action from a list of corrective actions according to the error location and/or the error information.

BRIEF DESCRIPTION OF THE DRAWINGS

Preferred embodiments of the invention will be described in more detail in connection with the appended drawings, which show in FIG. 1 a schematic of a patient sample analysis system and method according to one embodiment in a clinical context.

DETAILED DESCRIPTION

Figure 1:
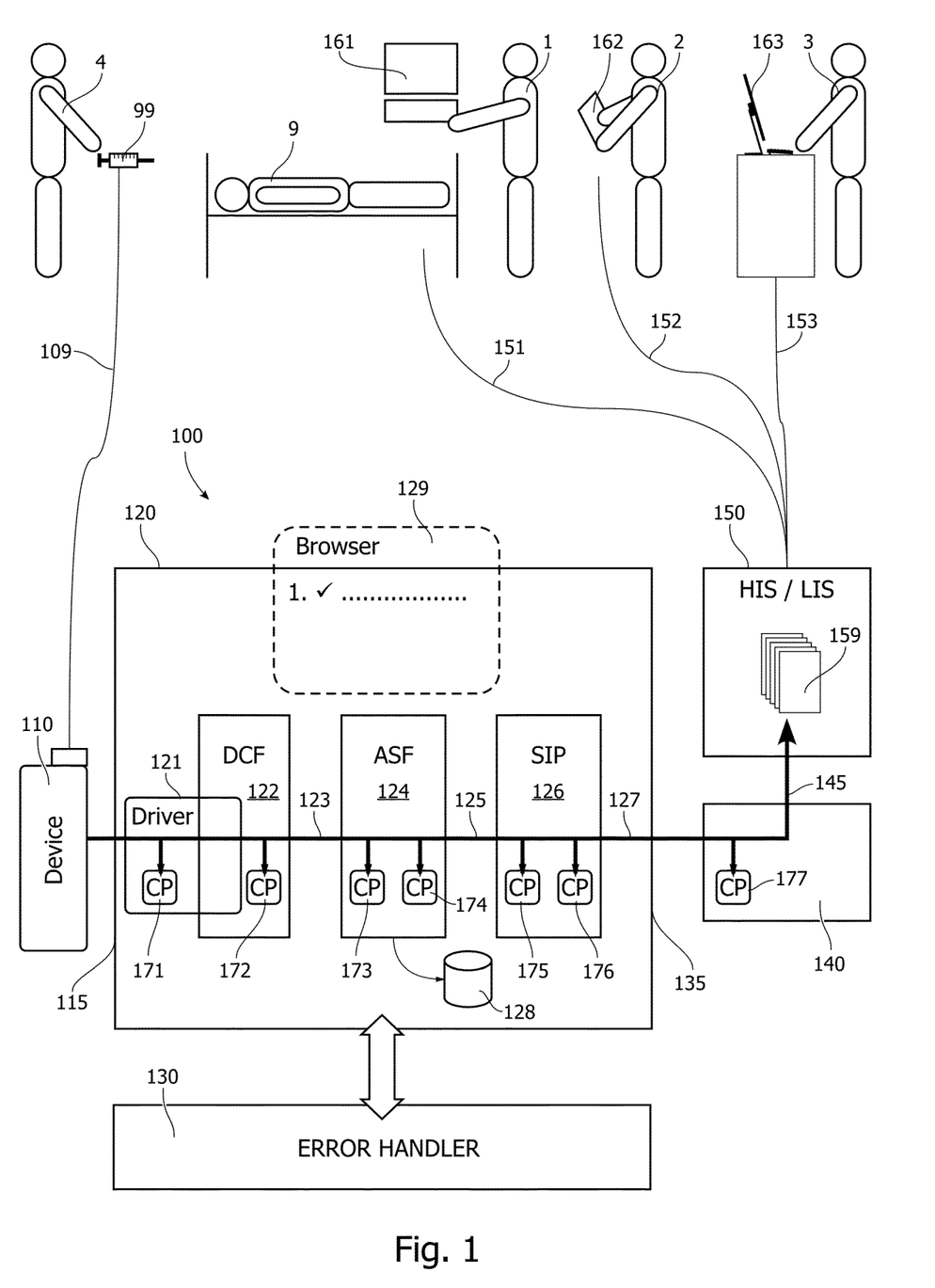

FIG. 1 shows a patient sample analysis system 100 according to one embodiment in a clinical context. FIG. 1 illustrates a sample analysis cycle from requesting a sample analysis to returning the outcome of the sample analysis. Information flows along the sample analysis cycle, in a direction from the requesting party (upstream), through the patient sample analysis system, and back to the requesting party (downstream) as follows. A clinician 1, 2, 3 in charge of treating a patient 9 requests a sample analysis, e.g. via electronic means, such as a bedside terminal 161, a mobile terminal 162, or a stationary computer terminal 163. Already at that point, a unique identifier may be created for the sample analysis to be performed, which uniquely identifies the sample throughout the entire sample analysis cycle. Clinical staff 4 sees to the taking of a required sample 99 of a bodily fluid, e.g. blood, urine, or any other suitable sample from patient 9. The sample 99 reaches the patient sample analysis system 100 via transfer 109. The patient sample analysis system 100 comprises medical analysis devices 110, each being adapted for performing measurements in respect of multiple specific analytes on patient samples 99. A measurement is performed on the sample 99 to produce a measurement result. A unique identifier is assigned to each measurement result, which in the case of a measurement on a patient sample typically may at least refer/relate to the unique identifier of the sample analysis request. The patient sample analysis system 100 further comprises a medical device management apparatus 120 communicating with the medical analysis devices 110 through an input interface 115. The measurement result is processed in the medical device management apparatus 120 to produce sample analysis data at an output interface 135 of the medical data management apparatus 120. The sample analysis data is delivered to a medical facility information system 150, such as a hospital information system (HIS) where the patient sample analysis data may be presented in electronic records 159, such as an electronic patient record. Once the sample analysis data is available in the electronic records 159, the clinician 1, 2, 3 may access the data in the medical facility information system 150 by any suitable means, such as terminals 161, 162, 163, through links 151, 152, 153, such as wired links, wireless links, or any other suitable data transfer means.

A measurement result may also originate at the medical analysis device itself, e.g. in the course of calibration and/or quality control (QC) routines to be performed on a regular basis for each of the medical analysis devices 110 in order to ensure proper functioning of the devices and comply with regulatory requirements. Such measurements are typically performed on suitable calibration/QC samples stored in the medical devices 110. Such medical device specific measurements are typically initiated in the course of a scheduled routine or upon request by an operator, e.g. through a user interface 129 of the medical device management system 120. Also in this case, a unique identifier is assigned to a measurement result produced by a device specific measurement, and the measurement result is collected by the medical device management system 120 through input interface 115. The measurement result is processed in the medical device management system 120 and output at output interface 135 as sample analysis data. The sample analysis data is delivered to a medical facility information system 150, such as a laboratory information system (LIS) where the patient sample analysis data may be presented in electronic records 159. Also this sample analysis data that is based on medical analysis device specific measurement results can be accessed from suitable terminals 161, 162, 163, which are connected to the medical facility information system 150 through links 151, 152, 153.

The measurement results provided by the medical devices 110 are processed in the medical device management system 120 in processing modules 121, 122, 124, 126 arranged along a data path extending from an upstream end at the input interface 115 to a downstream end at the output interface 135. The processing modules 121, 122, 124, 126 are connected by data path sections 123, 125, 127 adapted for transferring the measurement results after processing in one processing module to a subsequent processing module further downstream, or for presentation as sample analysis data at the output interface 135.

By way of example the patient sample analysis system 100 shown in FIG. 1 comprises: a device communication foundation module ("DCF") 122, with device driver components 121, which is adapted for handling any communication tasks between the medical analysis devices 110 and the medical device management apparatus 120, including data conversion and aggregation tasks; a service module ("AFS") adapted for handling service tasks, such as device management, calibration/QC tasks, process optimization, and compliance with regulatory provisions; and a system integration module ("SIP") adapted for handling communication with downstream systems, such as the medical facility information system 150. Furthermore additional middleware components 140 may be provided, which are adapted for facilitating correct interaction between the medical device management system 120 and the medical facility information system 150. The medical device management system 120 also comprises structured data storage means 128 for storage of measurement results.

Throughout the medical device management apparatus 120 check points (CP) 171-176 are arranged in the data path. An additional check point 177 is arranged in an additional data path section 145 in a downstream direction beyond the output interface of the medical device management apparatus 120. Each time a measurement result (or data derived from it) passes one of the check points 171-177, the measurement result (or derived data) is identified by the unique identifier assigned to the measurement result and a corresponding result status entry is added to a check point record. The result status entry for passage of a given measurement result (or derived data) through a given check point 171-177 comprises as a minimum a time stamp in relation to the unique identifier of the measurement result.

A first check point 171 is associated with the driver components and provides a time stamp for receipt of the measurement result by the medical device management system 120; a second time stamp is provided at the check point 172 after processing in the DCF-module 122, prior to transfer through data path section 123; a third time stamp is given by a check point at the upstream side of the AFS-module 124 upon receipt of the measurement result from section 123; after processing by the AFS-module a fourth time stamp is given by a check point 174 arranged at a downstream side of the AFS-module 124, prior to transfer by data path section 125; A fifth time stamp is given upon receipt of the measurement result by a check-point arranged at the upstream side of the SIP-module 126; after processing of the measurement result in the SIP-module 126, a sixth time stamp given by a check point at the downstream side of the SIP-module testifies the successful submission of the processed measurement result as sample analysis data for transfer through data path section 127 towards a point of delivery, wherein the additional check point 177 provides a seventh time stamp for successful passage through the further middleware component 140, before delivery to the medical facility information system (HIS/LIS) 150.

By inspecting the check point record for entries in regard of the passage of a given measurement result as identified by the unique identifier through the check-points 171-177, a check-in-check-out relation between any two of the check points can be established. For example, the first time stamp for check-point 171 may represent a check-in for processing in the medical device management apparatus 120, and the sixth time stamp for check point 176 may represent the proper check-out from the medical device management apparatus 120. On a more detailed level, e.g. the level of a processing module 122, 124, 126, a check point 171, 173, 175 located at the upstream side of the processing module 122, 124, 126 can be seen as a check-in for processing by said module 122, 124, 126, and a corresponding check point 172, 174, 176 located at the downstream side of the processing module 122, 124, 126 can be seen as a check-out indicating successful completion of the relevant processing tasks in said module 122, 124, 126.

The patient sample analysis system 100 further comprises an error handler 130 operable to inspect the check point record in respect of any of the check points 171-177. The error handler may be operated upon a spontaneous user request, or may be operated as a concurrent process to perform a scheduled or otherwise regular inspection, such as for monitoring the operation of the patient sample analysis system. Based on the inspection of the check points 171-177 any of the above-mentioned check-in-check-out relations may be established. The occurrence of an error is detected from a mismatch between check-in and check-out records, for example due to the absence of a check-out corresponding to an earlier registered check-in of a measurement result. At the same time, the error can be localized to have occurred on the data path section between the two check points in question. In case further check points are available on this data path section, the error location can be determined more precisely by also inspecting the check point record entries in respect of these check points. Once localized, an appropriate correction may be developed for that error according to the error location. The appropriate correction measures for a given error location may be known beforehand, stored, and made available to the error handler 130. The error handler 130 may then select a measure from a list of available measures in agreement with pre-determined criteria and initiate said measure. The error handler may further request and/or receive additional information about the error that has occurred, e.g. from an error log kept with a processing module where an error occurred and use said additional error information to develop more relevant error correction measures.

In one example, a missing measurement result may be re-sent/re-submitted from a previous point in the data path close to where the measurement result last has been registered by a check point. In another example, a missing calibration compliance information for a given medical analysis device could be mended by requesting a calibration or QC-measurement to be performed immediately, thereby confirming the continued compliance of the medical analysis device with the relevant compliance standards. Alternatively or in addition thereto, the error handler 130 may also present an error correction in the form of a guided procedure at an operator interface 129, so as to assist an operator of the patient sample analysis system 100 in dealing with the error.

Figure 2:
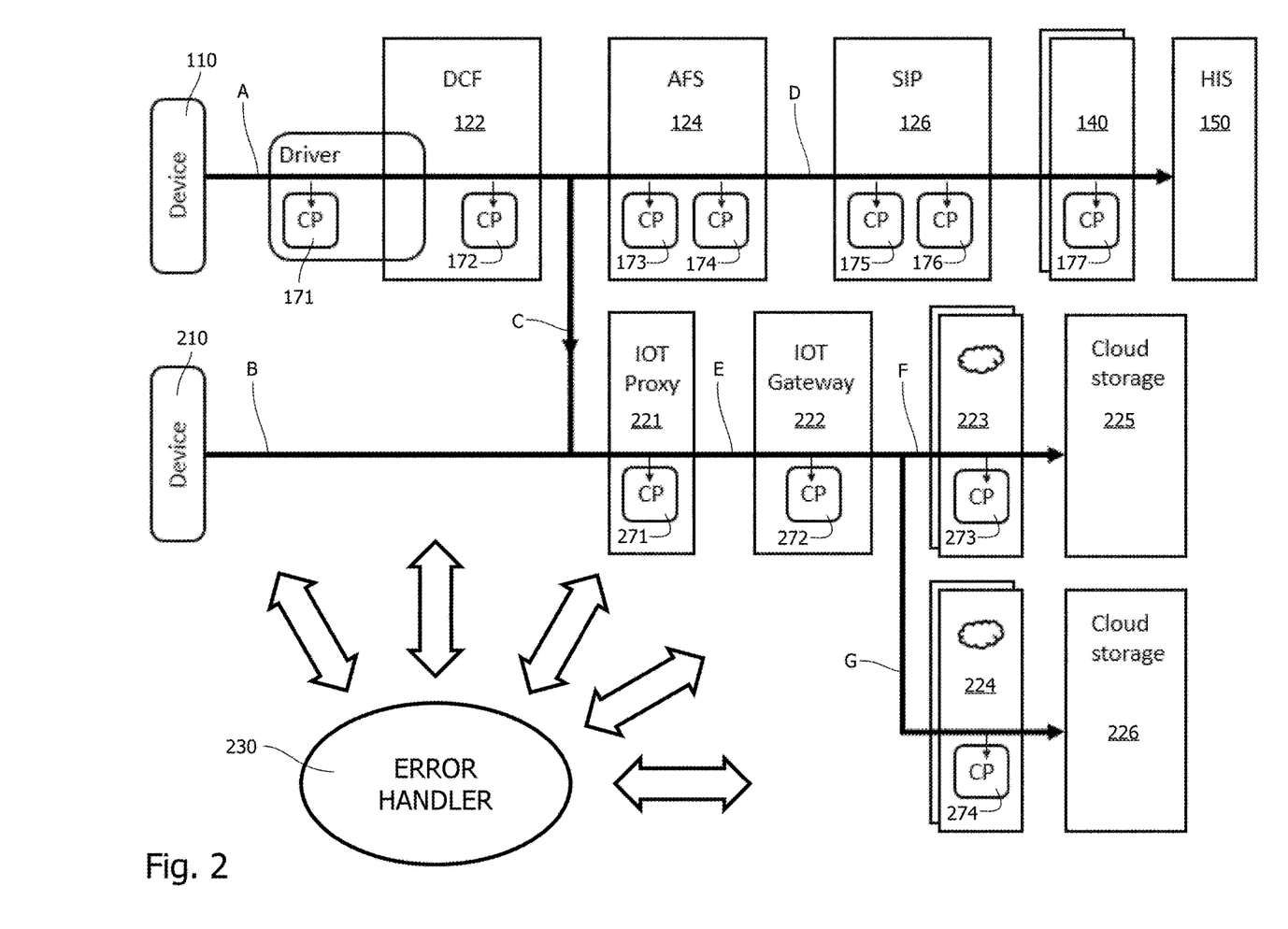
FIG. 2 a schematic of a patient sample analysis system and method according to a further embodiment; and in FIG. 3 a schematic of a patient sample analysis system and method according to a third embodiment.
Figure 3:
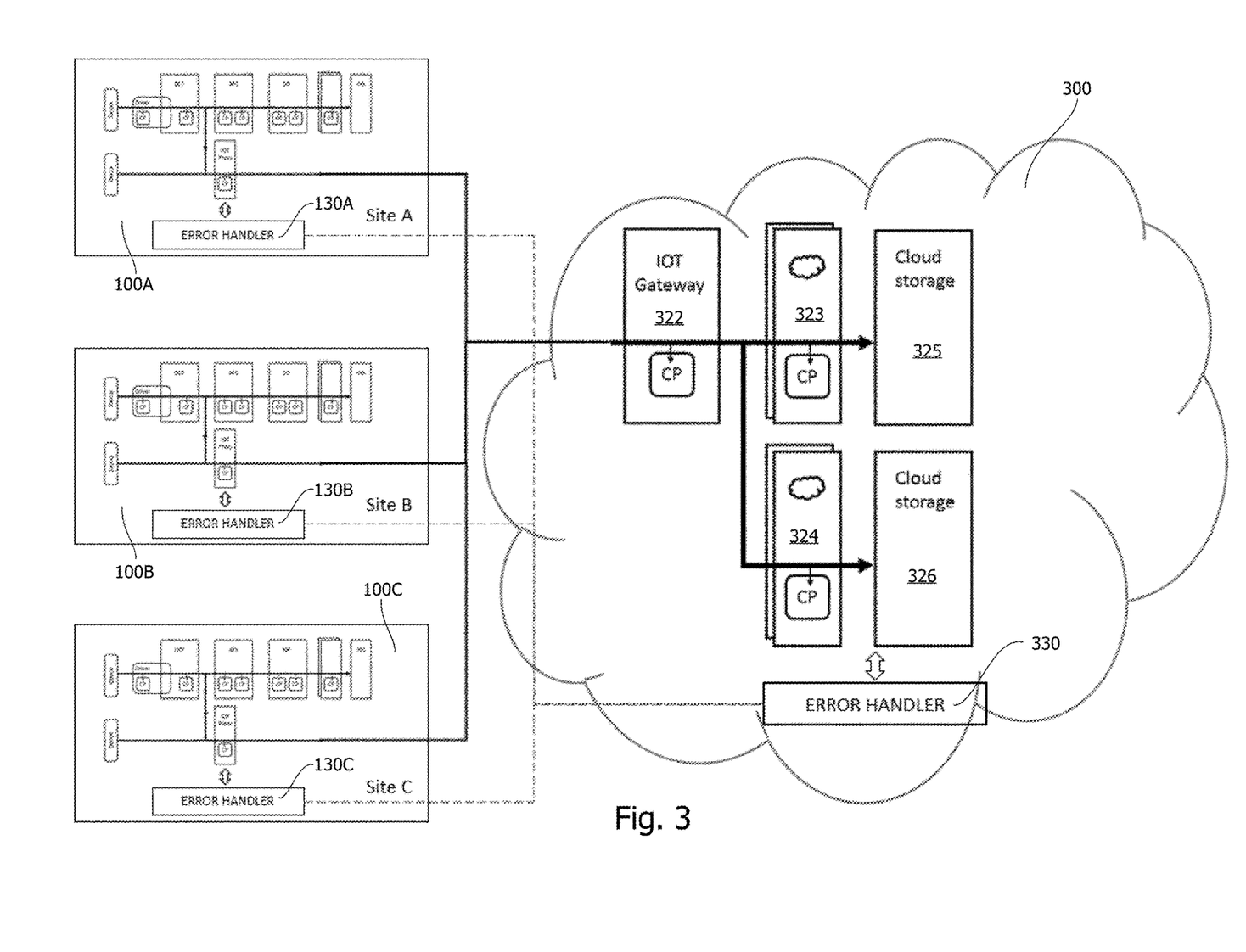

Referring to FIG. 2 and FIG. 3, two examples are briefly described in the following to show that the patient analysis system with error handling according to the invention may be implemented in numerous different configurations of increasing complexity.

FIG. 2 shows schematically a patient sample analysis system 200 with medical analysis devices 110, processing modules 121, 122, 124, 126, and further middleware components 140 delivering sample analysis data to a hospital information system 150 as described above. The medical analysis devices 110 may e.g. be placed in a central laboratory of a hospital site and the data path may reflect an essentially sequential processing of the measurement result on the way from the medical analysis device 110 to the hospital information system 150. The patient sample analysis system 200 comprises further medical analysis devices 210, which may be placed at different locations, e.g. distributed throughout the hospital closer to clinicians and patients, and/or for example in the homes of patients in remote care. The further analysis devices 210 may be configured for connection to a cloud service, where any of the required processing of measurement results produced by the medical analysis device 210 may be offered as a service. The remotely placed medical analysis devices 210 may communicate through any suitable communication protocol, e.g. an internet-based protocol (IOT) and provide processing in processing modules 221, 222, 223, 224. The processed measurement results may then be delivered as sample analysis data to cloud storage structures 225, 226. The data path for a measurement result produced by the remotely placed medical analysis devices 210 may include a proxy module 221 for measurement result processing close to the location of the medical analysis devices 210, a gateway 222 for handling and routing of measurement results, and cloud based modules 223, 224 for subsequent cloud-based processing steps and eventually delivery to the cloud storage structures 225, 226. Also the measurement results produced by the medical analysis devices 110 may be branched off and passed to cloud services for processing and storage in modules. For example, results from medical analysis devices 110 located at a hospital laboratory may after handling and processing in modules 121, 122 be branched off and passed via connection C to processing in modules 221, 222, 223, 224, and storage in structures 225, 226 in the same way as described above with respect to the measurement results from further medical analysis devices 210.

The data path for a given measurement result may thus comprise multiple branches A, B, C, D, E, F, G for processing and transporting a measurement result from the medical analysis device where it is produced towards a point of delivery, depending on the tasks to be performed. It may be noted that the cloud storage structures 225, 226 may also return data services to the patient analysis system, e.g. to the hospital information system 150, any of the processing modules 122, 124, 126, 221, 222, 223, 224, and/or any user terminals mentioned above with respect to FIG. 1. The data management is thus challenged by the complexity of the highly distributed and branched implementation of the patient sample analysis system 200. The patient sample analysis system 200 is therefore provided with numerous check points 171-177, 271-274 arranged in the various data path branches A-G throughout the patient sample analysis system 200. Each of the check points 171-177, 271-274 is configured to identify a measurement result received by its unique identifier and to add a corresponding result status entry in relation to the unique identifier to a check point record, when the result is passed through said check point. The patient sample analysis system 200 further comprises an error handler 230, which is operable to inspect the check point records of the check points 171-177, 271-274, and detect if an error has occurred based on that inspection. In case an error is detected, e.g. from a mismatch in the check point record, the error handler 230 determines an error location of the error on the data path, and develops an error correction based on the error location. The error handler 230 thus interacts with the check points 171-177, 271-274 arranged throughout the system and can determine the whereabouts of missing results, locate potential error sources, alert a user or operator of the system, and attempt, or at least suggest an error correction actions. Any issues that may arise may thus be dealt with by the error handler 230 in a swift and efficient manner, or at least brought to someone's attention, who then can act upon that information according to a guided procedure provided by the error handler. The cloud service 300 may thus connect and serve a plurality of local patient sample analysis systems to form a global patient sample analysis system.

FIG. 3 shows schematically a plurality of local patient sample analysis systems 100A, 100B, 100C located at different sites A, B, C. Each of the patient sample analysis systems is adapted to process and transport measurement results from medical analysis devices through processing modules and further middleware components to their delivery points as sample analysis data to a hospital information system. The local patient sample analysis systems 100A, 100B, 100C further comprise proxy processing modules through which the measurement results may be passed on to cloud based processing in a cloud based implementation 300 comprising cloud processing modules 322, 323, 323 and cloud storage structures 325, 326 for the structured storage of sample analysis data. In analogy to what has been mentioned above, the cloud implementation 300 may also return data services to the local systems 100A, 100B, 100C at sites A, B, C. In such a configuration, it may be advantageous to have a plurality of site error handlers 130A, 130B, 130C, and a cloud error handler 330, each of the site and cloud error handlers being associated with a site implementation 100A, 100B, 100C, and the cloud implementation 300, respectively. The error handlers 130A, 130B, 130C, 330 are each operable to perform the inspection, error localization, and error correction tasks in interaction with the check points in the respective site and cloud implementations 100A, 100B, 100C, 300 as described before. Preferably, the site and cloud error handlers 130A, 130B, 130C, 330 may be linked together as indicated by the broken line in the schematic of FIG. 3 so as to form a distributed error handler adapted to perform the inspection, localization and correction tasks in a global manner.

The invention claimed is:

1. A patient sample analysis system comprising:
at least one medical analysis device adapted to receive a sample, perform a measurement on the sample, and produce a measurement result based on the measurement, wherein the measurement result has a unique identifier;
a medical device management apparatus comprising an input interface adapted to collect the measurement result from the at least one medical analysis device, an output interface adapted to output sample analysis data based on the measurement result towards a point of delivery, and at least one processing module arranged in a data path extending from an upstream end at the input interface to a downstream end at the output interface;
wherein the patient sample analysis system further comprises:
two or more check points arranged in the data path, wherein:
a first check point of the two or more check points is arranged upstream of the at least one processing module and is physically separated along the data path from a second check point of the two or more check points;
the second check point of the two or more check points is arranged downstream of the at least one processing module;
each check point is configured to identify the measurement result by the unique identifier and to add a corresponding result status entry in relation to the unique identifier to a check point record, when the result is passed through said check point;

each result status entry includes a check-in record or a check-out record; and each check point is paired with another check point of the two or more check points, each pair including a check-in record and a check-out record; and an error handler operable to inspect the check point record, detect the occurrence of an error based on that inspection, determine an error location of the error on the data path, and develop an error correction based on the error location, wherein the error correction comprises one or more of: a restart of a software module associated with the error location, a suggestion of an error handling action, a guided procedure at an operator interface, an alert to a service operator of at least one of the at least one medical analysis devices, and an indication of an operative replacement medical analysis device;

wherein:

the at least one processing module of the medical device management apparatus comprises a plurality of processing modules;

the two or more check points arranged in the data path comprises, in addition to the first check point and the second check point, a plurality of additional check points disposed between the first check point and the second check points;

each pair of neighboring check points from the two or more check points defines a data path section on the data path between those neighboring check points;

no data path section between the upstream end at the input interface and the downstream end at the output interface has more than one processing module between the neighboring check points that define that data path section; and the error handler is operable to determine the error location of the error on the data path by repeatedly performing acts comprising:

performing a check point identification by identifying first and second inspected check points, wherein the first inspected check point has added a check in result status entry in relation to the unique identifier to the check point record, and wherein the second inspected check point has not added a check in result status entry in relation to the unique identifier to the check point record; and if the first and second inspected check points from the most recent performance of the check point identification are not neighboring check points, repeat the check point identification with new first and second inspected check points, wherein the new first and second inspected check points are separated by fewer data path sections than the first and second inspected check points from the most recent performance of the check point identification.

2. The patient sample analysis system according to claim 1, wherein each check point comprises an identification process adapted to uniquely identify a measurement result passed through the check point based on its unique identifier, and a record-keeping process adapted to generate a result status entry in relation to the unique identifier.

3. The patient sample analysis system according to claim 1, wherein the result status entry includes a time stamp in relation to the unique identifier for the measurement result for passage through the check point.

4. The patient sample analysis system according to claim 1, wherein at least one processing module is further configured to keep an error log.

5. The patient sample analysis system according to claim 1, wherein the error handler comprises an inspection process, an error detection process, an error localization process, and an error correction process.

6. The patient sample analysis system according to claim 5, wherein the inspection process is adapted to perform an inspection for result status information in respect of the one or more check points in the data path;

wherein the error detection process is adapted to detect the occurrence of an error based on the result status information from the inspection process;

wherein the error localization process is adapted, upon detection of an error, to localize the error to a check point in the data path and/or to a data path section adjacent to a check point in the data path (upstream or downstream thereof); and/or wherein the error correction process is adapted to associate error correction measures with the check point or data path section to which the error has been localized by the error localization process.

7. The patient sample analysis system according to claim 1, wherein the at least one processing module includes processes implementing one or more of: device communication, data format conversion and aggregation, quality control and calibration management, surveillance of compliance with regulatory requirements, and result storage and retrieval, statistical analysis, analysis of the measurement result, classification of the measurement result according to known values for one or more pathological states of a patient, data presentation, data transfer and presentation, and data exchange with electronic health record systems.

8. The patient sample analysis system according to claim 1, wherein operation of the error handler is initiated upon request and/or wherein operation of the error handler is performed on a regular basis.

9. The patient sample analysis system according to claim 1, wherein the data path includes additional data path sections arranged in an upstream direction beyond the input interface of the medical device management apparatus and/or in a downstream direction beyond the output interface of the medical device management apparatus, and wherein the additional data path sections include at least one or more additional check points.

10. A method of analyzing a sample in a patient sample analysis system with respect to at least one analyte, the patient sample analysis system including a plurality of medical analysis devices located at different physical locations, and the method comprising:

providing a medical analysis device of the plurality of medical analysis devices;

the medical analysis device of the plurality of medical analysis devices producing a measurement result based on a measurement performed by the medical analysis device on the sample in respect of the analyte;

a medical device management apparatus performing acts of:

determining a data path for processing and transporting the measurement result and a unique identifier for the measurement result, the data path including multiple branches;

passing the measurement result through at least two check points arranged in the data path wherein:

a first check point of the two or more check points is
  arranged upstream of at least one processing module and is physically separated along the data path
  from a second check point of the two or more
  check points;
the second check point of the two or more check
  points is arranged downstream of the at least one
  processing module, and
adding a result status entry in relation to the unique
  identifier to a check point record, wherein the result
  status entry includes a check-in record or a check-out
  record, and wherein each check point is paired with
  another check point of the at least two check points,
  each pair including a check-in record and a check-out record;
processing the measurement result to produce sample
  analysis data based on the measurement result;
outputting the sample analysis data towards a point of
  delivery;
an error handler performing acts of:
  inspecting the check point record;
  detecting the occurrence of an error and determining an
    error location of the error on the data path based on
    that inspection; and
  developing an error correction based on the error
    location, wherein the error correction comprises one
    or more of: a restart of a software module associated
    with the error location, a suggestion of an error
    handling action, a guided procedure at an operator
    interface, an alert to a service operator of at least one
    of the at least one medical analysis devices, and an
    indication of an operative replacement medical
    analysis device;
the at least one processing module comprises a plurality
  of processing modules;
the two or more check points arranged in the data path
  comprises, in addition to the first check point and the
  second check point, a plurality of additional check
  points disposed between the first check point and the
  second check point;
each pair of neighboring check points from the two or
  more check points defines a data path section on the
  data path between those neighboring check points;
no data path section has more than one processing module
  between the neighboring check points that define that
  data path section; and
the error handler is operable to determine the error location of the error on the data path by repeatedly performing acts comprising:
  performing a check point identification by identifying
    first and second inspected check points, wherein the
    first inspected check point has added a check in
    result status entry in relation to the unique identifier
    to the check point record, and wherein the second
    inspected check point has not added a check in result
    status entry in relation to the unique identifier to the
    check point record; and
  if the first and second inspected check points from the
    most recent performance of the check point identification are not neighboring check points, repeat the
    check point identification with new first and second
    inspected check points, wherein the new first and
    second inspected check points are separated by fewer
    data path sections than the first and second inspected
    check points from the most recent performance of
    the check point identification.

11. The method according to claim 10, wherein processing is performed in at least one distinct processing module arranged along the data path.

12. The method according to claim 10, wherein detecting an error includes:
  inspecting for the presence of result status entries for the uniquely identified measurement result in respect of first and second check points; and
  stating the occurrence of an error in a location on the data path between the first and second check points, if a mismatch between the result status entries in respect of the first and second check points is found.

13. The method according to claim 10, wherein processing the measurement result includes keeping an error log with error information for errors occurring during processing.

14. The method according to claim 10, wherein developing an error correction includes:
  in respect of the determined error location, inspecting an error log for messages identifying errors; and/or
  identifying an error message associated with the measurement result; and/or
  selecting an error handling action from a list of corrective actions according to the error location and/or the error information.

15. The patient sample analysis system according to claim 1, wherein the error correction comprises one or more of: a suggestion of an error handling action, a guided procedure at an operator interface, an alert to a service operator of at least one of the at least one medical analysis devices, and an indication of an operative replacement medical analysis device.

16. The method according to claim 10, wherein the error correction comprises one or more of: a suggestion of an error handling action, a guided procedure at an operator interface, an alert to a service operator of at least one of the at least one medical analysis devices, and an indication of an operative replacement medical analysis device.

17. The patient sample analysis system of claim 1, wherein the at least one processing module arranged in the data path comprises a plurality of processing modules arranged in the data path, wherein the plurality of processing modules comprises:
  a device communication foundation model adapted for handling communication tasks between the at least one medical analysis device and the medical device management apparatus;
  a service module adapted for handing one or more quality control and/or calibration tasks using the measurement result; and
  a system integration module adapted for handling communication with downstream systems via the output interface.

18. A system comprising a medical device management apparatus comprising:
  an input interface adapted to collect measurement results having respective unique identifiers;
  an output interface adapted to output sample analysis data based on the measurement results;
  at least one processing module arranged in a data path from an upstream end at the input interface to a downstream end at the output interface;
  two or more check points arranged in the data path, wherein:
    a first check point of the two or more check points is arranged upstream of the at least one processing module and is physically separated along the data path from a second check point of the two or more check points;

the second check point of the two or more check points is arranged downstream of the at least one processing module;

each check point is configured to identify measurement results by their respective unique identifier and to add corresponding result status entries in relation to the unique identifiers to a check point record, when measurement results are passed through said check point; and each result status entry includes a check-in record or a check-out record;

wherein:

the system further comprises an error handler operable to inspect the check point record, detect the occurrence of an error based on that inspection, determine an error location of the error on the data path, and develop an error correction based on the error location;

the at least one processing module of the medical device management apparatus comprises a plurality of processing modules;

the two or more check points arranged in the data path comprises, in addition to the first check point and the second check point, a plurality of additional check points disposed between the first check point and the second check point;

each pair of neighboring check points from the two or more check points defines a data path section on the data path between those neighboring check points;

no data path section between the upstream end at the input interface and the downstream end at the output interface has more than one processing module between the neighboring check points that define that data path section; and the error handler is operable to determine the error location of the error on the data path by repeatedly performing acts comprising:

performing a check point identification by identifying first and second inspected check points, wherein the first inspected check point has added a check in result status entry in relation to a unique identifier to the check point record, and wherein the second inspected check point has not added a check in result status entry in relation to the unique identifier to the check point record; and if the first and second inspected check points from the most recent performance of the check point identification are not neighboring check points, repeat the check point identification with new first and second inspected check points, wherein the new first and second inspected check points are separated by fewer data path sections than the first and second inspected check points from the most recent performance of the check point identification.

* * * * *